Feb. 20, 1962 E. G. COOK ETAL 3,021,706
ULTRASONIC MATERIALS TESTING SYSTEM
Filed July 2, 1957 3 Sheets-Sheet 1

INVENTORS
EDWARD G. COOK
WILLIAM I. SHEPLEY
BY
ATTORNEY

United States Patent Office 3,021,706
Patented Feb. 20, 1962

3,021,706
ULTRASONIC MATERIALS TESTING SYSTEM
Edward G. Cook, Packanack Lake, and William I. Shepley, Boonton, N.J., assignors to Curtiss-Wright Corporation, a corporation of Delaware
Filed July 2, 1957, Ser. No. 669,592
7 Claims. (Cl. 73—67.8)

This invention relates to ultrasonic materials inspection systems, and more particularly to a system employing wide angle scanning utilizing a transducer having no moving parts.

Heretofore, when employing ultrasonic equipment for inspecting the interior of hollow materials, such as oil wells, objects with unusual or normally inaccessible openings, gun barrels or other cylinder or pipe-type structures, the inspection of the materials was frequently carried out from within the interior of the body to be tested or not tested at all. In order to accomplish internal inspection, an immersion type transducer was attached to a search tube by means of a connector, usually of the right-angle type. The search tube was then inserted within the hollow body or cavity of the body to be inspected, and the transducer on the end of the search tube was mechanically rotated to provide the wide angle or 360° inspection angle.

In many applications, such as in the testing of casings of oil wells, it is not practical to provide a mechanical scanning system because of the frequent need for high pressure seals between the rotating parts. While other arrangements employing moving parts of the transducer might be employed under certain conditions, ordinarily they are impractical because of the slow scanning speeds inherent in conventional mechanical scanning systems.

The present invention overcomes the undesirable features of mechanical scanning by utilizing an electrical scanning arrangement obtained by providing and simultaneously operating a plurality of transducers properly spaced and mounted around the periphery of a mounting element or "backing" member.

It is an object of the present invention to provide a novel ultrasonic materials testing system.

Another object of the invention is to provide a novel ultrasonic inspection system employing a unique transducer arrangement to provide wide angle scanning.

Another object is to provide a novel transducer totally free of moving parts for wide angle scanning.

A further object is to provide a novel materials testing system employing ultrasonics for remote inspections of materials.

A further object is to provide a novel remote ultrasonic inspection system utilizing a transducer-carrying capsule to permit 360° of instantaneous scanning.

A further object is to provide a novel scanning arrangement employing no moving parts for use in conjunction with oil well inspection techniques.

The present invention contemplates 360° of instantaneous scanning employing ultrasonic techniques for materials testing. One feature of the invention utilizes a transducer having a multiplicity of piezoelectric elements symmetrically disposed about a supporting backer to provide 360° of scanning, and wherein the received signals are communicated to a remote point above the surface of the ground to indicate the condition of the materials being tested. The transducer-carrying capsule is capable of being lowered into an oil well casing at a predetermined rate and an indicator will show the presence of a flaw or discontinuity and simultaneously indicate the relative location by telemetering equipment.

The foregoing and other objects and advantages of the invention will appear more fully hereinafter from a consideration of the detailed description which follows, taken together with the accompanying sheets of drawings, wherein several embodiments of the invention are illustrated by way of example. It is to be expressly understood, however, that the drawings are for the purpose of illustration and description only and are not intended as a definition of the limits of the invention.

Figure 1:
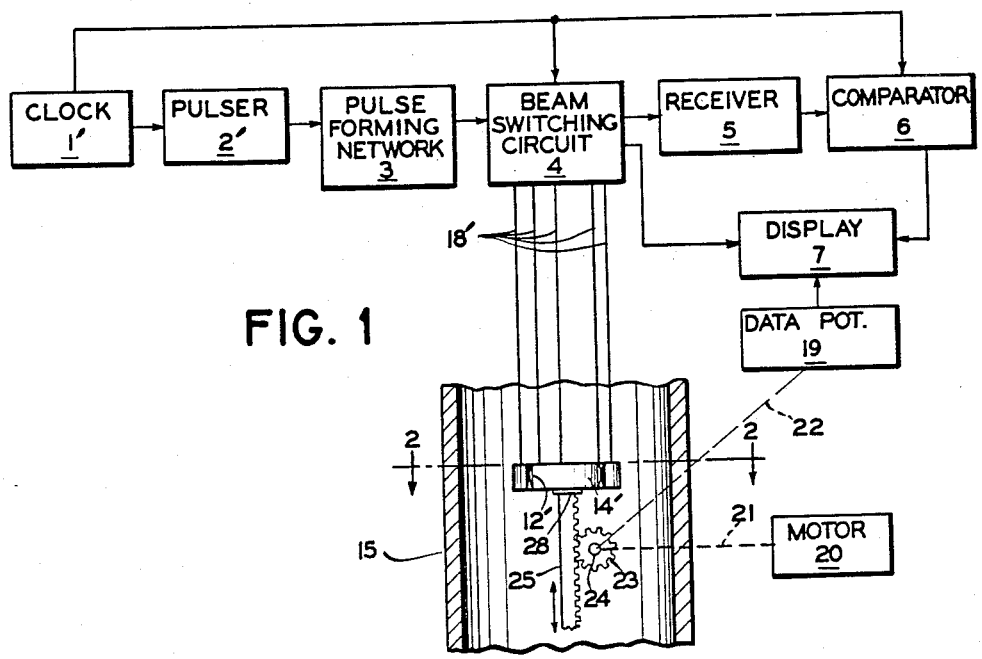
FIG. 1 is a representative block diagram showing certain equipments representing one form of the invention.
Figure 2:
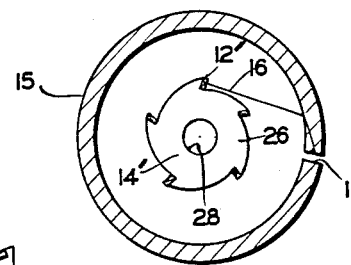
FIG. 2 is a sectional view taken substantially along line 2—2 of FIG. 1.

Referring to the drawings, and more particularly to FIGS. 1 and 2, there is shown a representative block diagram of an electronic system connected with a transducer for internal inspection of a cylindrical work piece.

In the block diagram there is shown a timing device or clock $1'$ which may be any form of conventional timing arrangement connected to a pulser $2'$, which in turn is connected to a pulse forming network 3, a beam switching circuit 4, a receiver 5, a comparator 6, and a display device 7. The piezoelectric elements of transducer $14'$ are energized by means of beam switching circuit 4. The beam switching circuit may contain a tube for individual pulsing of each piezoelectric element in a prescribed program, or it may contain a switch to connect all the elements in parallel for simultaneous pulsing. The electrical voltage is attained from pulser $2'$. The pulser may consist of a thyratron or similar switch which discharges a pulse through pulse forming network 3. Pulse forming network 3 may be simply an R-C combination or a tuned circuit for shaping the driving electrical voltage into high voltage pulses. The high voltage pulses are applied to the beam switching circuit 4 and employed to drive the crystals $12'$. The high voltage pulses are also coupled directly to the receiver 5 and passed on to the comparator 6. The crystals $12'$ are thus pulsed periodically and transmit ultrasonic waves into a casing 15 or the like to be inspected. Ultrasonic waves reflected normally by defects within the casing are received by the crystals $12'$ and converted into electrical or echo signals. The electrical signals are fed from the crystals through the beam switching circuit 4 and the receiver 5 and comparator 6. Both the high voltage pulses and the electrical signals from the crystals $12'$ are applied to the comparator 6 through the receiver 5. The comparator 6 includes circuitry for the timed gated interrogation of the receiver 5 so as to reject the high voltage pulses but to accept the echo signals produced by the crystals $12'$.

With this arrangement the comparator can be made to reject all fault or echo signals from all except one of the crystals $12'$ for any given position of the crystal support on the longitudinal axis of the casing 15. This is possible when the crystals are pulsed either simultaneously or in seriation. The gating interval is variable but of sufficient length to reject the high voltage pulses. Thus the comparator 6 functions as a timing gate to select prescribed portions of the received signal. The comparator 6 is arranged to provide pulse height or amplitude discrimination of the electrical signals received from the crystals $12'$. That is the comparator 6 is arranged so that the voltage amplitude of the electrical signals from the crystals 12' is greater than the amplitude of any unwanted electrical and acoustical signals inherent in the system. This type of circuitry is well known and need not be described in detail. The output of comparator 6 is fed into a display circuit which may be a cathode ray tube or other indicator whose time sweep may be synchronized with the travel of the transducer by use of the potentiometer or data potentiometer 19. The pulser, beam switching circuit, comparator and display are all synchronized by means of clock 1'. Thus, the information contained in display 7 can provide both amplitude and time information concerning defects in cylinder 15. The beam switching circuit 4 and the comparator 6 are also connected directly from the clock 1'. A motor 20 is connected by shaft 21 with a pinion gear 23, which is rotatable on a shaft 24, with said pinion engaging a movable rack 25. A transducer unit 14' is carried on the end of the movable rack 25, with the shaft 24 being carried by the same supporting structure as the rack since they are employed for operation of the rack 25. In the transducer arrangement, a collar 28 fits through the transducer 14' and is shown connected to the upper end of the rack 25.

In FIG. 2 there are shown five piezoelectric crystals 12' disposed substantially equidistantly spaced about the transducer unit 26, so that when said transducer unit is in a stationary position substantially as shown in FIG. 1, and energized by the signals coming through the conductor 18', there will be 360° of instantaneous inspection of the cylinder 15.

The ultrasonic beam such as 16 will emanate from the crystals 12' and be refracted through the cylinder 15 in conventional manner until it impinges a discontinuity such as flaw 17.

While there are five crystals 12' shown in FIG. 2, there is a transducer unit 14 (FIG. 3) having eighteen crystals 12, disposed suitably thereon. Conductors 18 connect one face of each of the crystals 12 to the respective terminals 30, said terminals being connectable to the conductors 18' by mating terminals.

Figure 4:
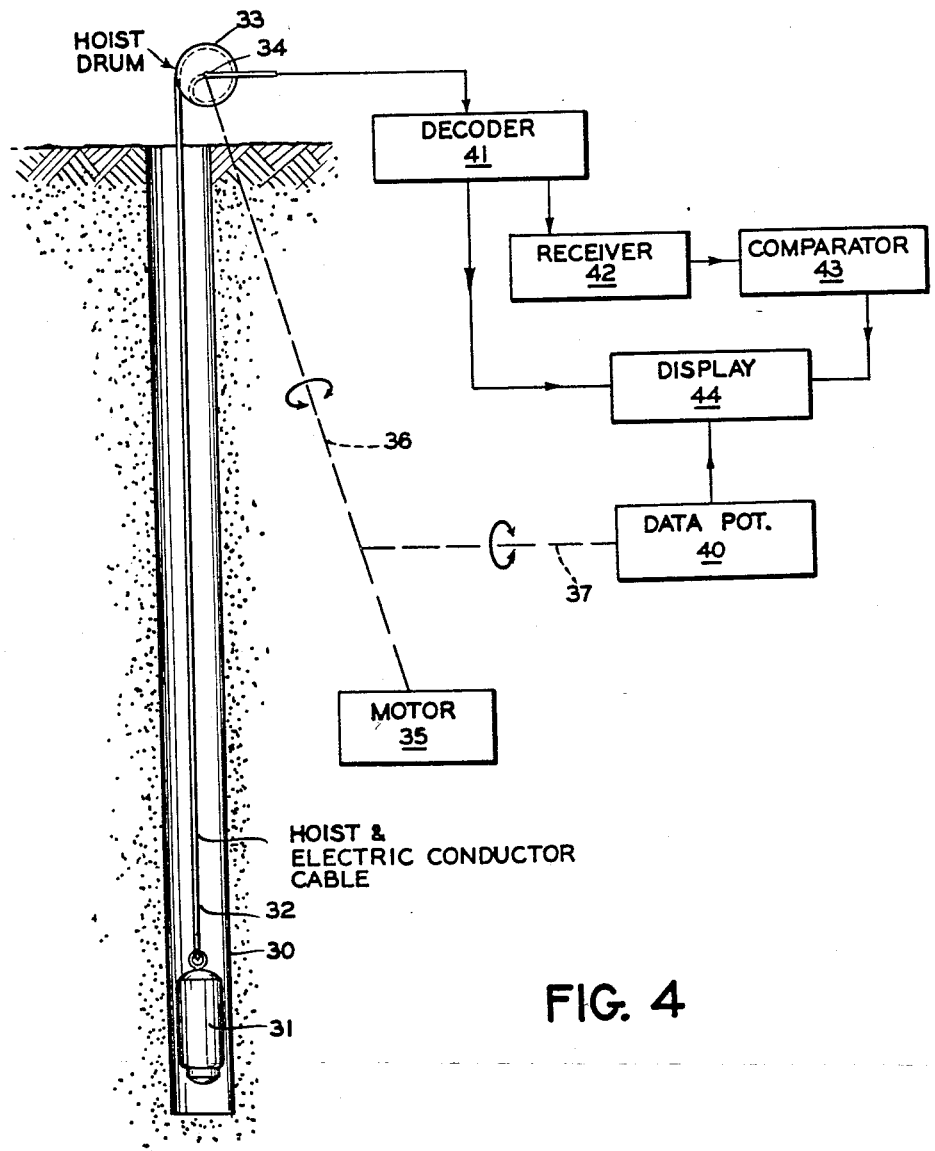
FIG. 4 is a modification of FIG. 1, wherein a beam switching circuit is carried within a capsule and disposed adjacent the transducer.
Figure 5:
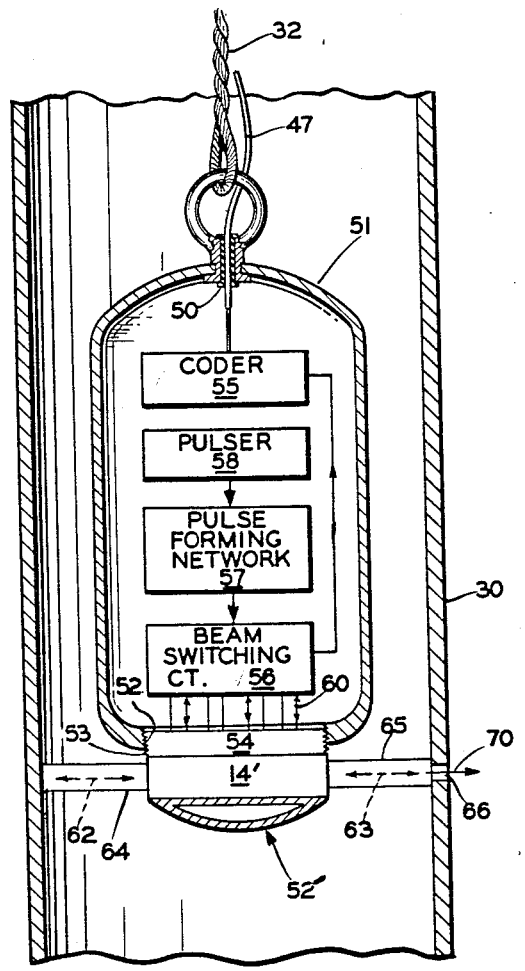
FIG. 5 is a sectional view of one form of the capsule positioned in an oil well casing.

In FIGS. 4 and 5 there is shown a modification of the system presented in FIG. 1 and its particular application is usable in conjunction with the inspection of oil well casings. An oil well casing 30 has a capsule 31 suspended therein by a hoist cable 32 carried on a hoist drum 33 having a shaft 34. A motor 35 is connected by shafts 36 and 37 respectively to the hoist drum shaft 34 and a data potentiometer 40. The cable 32 is actually a combination of a hoist cable and an electric conductor cable which connects the capsule 31 and its equipment to the electronic equipment above the ground which includes a decoder 41 which is connected to a receiver and a comparator, 42 and 43 respectively, and thence to a display device 44. The decoder 47 is also directly connected to the display device 44.

The capsule 31 is disposed within the oil well casing 30, and has the conductor cable 32 which includes an electric conductor cable portion 47, which passes through an insulator sleeve 50 to the interior of the capsule shell 51. The lower portion of the capsule shell 51 has a threaded portion 52 with internal threads thereon which engage the external threads 53 which are carried by a plate 54, secured to the transducer unit 14'. A nose 52' is fastened on the lower surface of the transducer unit 14', the nose being combined as a unit in any convenient or conventional manner, such as by having fasteners or screws secured together through the three elements, 54, 14', and 52'.

Figure 3:
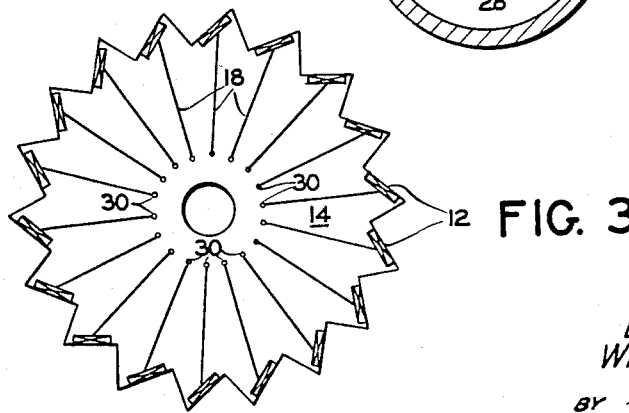
FIG. 3 is a top view of a modification of the transducer shown in FIG. 1 and also being capable of 360° instantaneous scanning.

Within the capsule 31 there is connected a coder 55, which is directly connected to a beam switching circuit 56, which beam switching circuit is in turn connected to a pulse forming network 57 and a pulser 58. The beam switching circuit 56 is connected by conductors such as 60 to the crystals such as 12', or 12, via terminals such as 30 (FIG. 3).

In FIG. 5 it will be seen by the arrows 62 and 63 that the representative signal beams 64 and 65 from separate crystals have the signals emanate from the crystals and if the signals are reflected from defects in the interior of the well casing, return to the crystals to provide echo signals which are coded by the coder 55 within the capsule and transmitted through the decoder 41 (see FIG. 4) to the display device 54. When this condition occurs, the received signal from the display device 44 will be noted, and by means of the data potentiometer there will be indicated the relative position or depth location of the aperture 66. Potentiometer or data potentiometer 40 is connected to the shaft of hoist drum 33 by connections or shafts 37 and 36. As the hoist drum unwinds and lowers the instrument 31 into well 30, the output of data potentiometer 40 will be proportional to this depth. By this means, display 44 can be synchronized with the lowering of instrument 31 and depth information may be obtained. The display system may consist of a direct writing oscilloscope whose galvanometer movement is energized by the output of comparator 43. The horizontal movement of the paper may be synchronized with the output of the data potentiometer 40 and hence linear travel of paper will be synchronized with depth of instrument 31 within the well.

Referring again to FIG. 1, the piezoelectric elements such as crystals 12 and 12' may be any thickness mode crystals, such as quartz, lithium sulfate, or ceramic. The crystals are attached each at a predetermined angle around the periphery of a ratchet-like backing member 14 or 14'. The angle of the crystal depends upon the angle of travel of the acoustic beam required within the wall of the pipe casing. The angle should be chosen to minimize unwanted acoustic signals from the inside and the outside surface of the casing. The backing member may be a plastic material such as an epoxy resin or may be any other convenient backing member depending upon the desired characteristics of a suitable backing member for the particular crystals employed. The conductors 18 and 18' from the crystals are electrically isolated from each other and are carried from the crystals to approximately the center of the backing member such as 14 or 14'. The conductors from the crystals make electrical connection with a beam switching circuit 4. The transducer assembly is placed within the cylinder 15 and the crystals are energized by the pulsing system through the beam switching circuit shown in block 4. The beam switching circuit may contain a tube (known as the Trichoidal tube) for individual pulsing of each transducer in a prescribed program, or it may contain a switch to connect all of the crystals in parallel for simultaneous pulsing. The choice depends upon whether the system is required to determine the position of a defect or just the presence of any defect in the cylinder 15. Pulsing the crystals generates an acoustic beam which travels through a suitable couplant such as water to the cylinder 15. Depending upon the angle of mounting of the crystals, the acoustic beam 16 from the respective crystals will enter the pipe casing normal or at an angle to the inside surface. If the beam 16 enters at an angle, the beam will be refracted and travel around the pipe 15 until meeting a discontinuity such as 17. Upon meeting discontinuity 17, portions of the beam reflected normally by the discontinuity are returned to and received by the crystals and sent to the receiver 5 by means of the beam switching circuit 4. The output of receiver 5 is fed into comparator 6 for purposes of time or amplitude determination. The comparator 6 is synchronized with beam switcher 4 and clock 1'. The output of comparator 6 is fed into a convenient display system 7. Display system 7 is synchronized with the beam switcher 4 and may consist of either a cathode ray oscilloscope or a suitable direct writing recorder or other display or recording instrument.

By moving the transducer unit axially and synchronizing this movement by means of the data potentiometer 19 with the display 7, a continuous record may be made of the quality of the pipe as a function of distance. Since a multiplicity of crystals 12 are spaced about backing member 14, the entire area of 15 will be scanned. Thus, 360° of scanning is provided by a transducer unit having no moving parts and depending on the circuitry employed the 360° may be instantaneous scanning.

The purpose of the coder is to convert the information obtained from the beam switching circuit into a form which may be readily transmitted over a long distance via cables, and which at the receiving end can be decoded or reconverted back into the original form. Any conventional circuitry suitable for the particular operation may be utilized in the coder and decoder arrangements.

The specification specifically sets forth arrangements wherein the transducer elements each have a face disposed at a predetermined angle relative to one another, and that the elements are equidistantly spaced from one another. It is to be understood that the shown arrangements of the elements are desirable, and preferred under certain conditions. However, it is to be understood that the elements need not be equidistantly spaced, nor need they be restricted to having the outer faces thereof set forth at the angles shown in the drawings, nor are they limited to the same relative angles.

Various sizes and thickness of piezoelectric elements may be employed, and the transmitting faces of the piezoelectric elements may be dispersed at various angles with respect to each other, and also with respect to the entrant work service. While a specific number of piezoelectric elements are shown in various modifications of the invention, the number of piezoelectric elements is not limited since this will be determined by the results desired.

While uniform thickness pipe is shown, it is to be understood that the invention is not limited to the inspection of cylindrically-shaped objects. Some work pieces may have very irregular shapes and thicknesses of dissimilar dimensions requiring a different placement of the piezoelectric elements in the transducer means than those shown in the drawings.

Although several embodiments of the invention have been illustrated and described in detail, it is to be expressly understood that invention is not limited thereto. Various changes can be made in the design and arrangements of the parts without departing from the spirit and scope of the invention as will now be understood by those skilled in the art.

What is claimed is:

1. A transducer for inspecting tubular members which comprises a substantially cylindrical support having a plurality of equally spaced, flat surfaces, said flat surfaces extending parallel to the longitudinal axis of the support and lying in planes which form acute angles with diametrical and intersecting planes passing through said longitudinal axis of said support, a piezoelectric element secured to each of said flat surfaces, and means for electrically pulsing each of said piezoelectric elements to form a plurality of overlapping angularly disposed beams providing beamed vibrations over 360°, said ultrasonic beams impinging upon the inner surface of said tubular member at an acute angle therewith whereby said ultrasonic beams are reflected and travel within said tubular member.

2. Apparatus for inspecting tubular members which comprises a plurality of transducers spaced apart in a generally circular direction for generating a plurality of overlapping, angularly disposed beams of ultrasonic vibrations providing beamed vibrations over 360° and for receiving ultrasonic vibrations reflected normally within the casing, means for supporting the transducer within the casing whereby the ultrasonic vibrations impinging on the inner surface of the tubular member at an acute angle and are refracted and travel within the casing, said ultrasonic vibrations impinging normally on defects within the casing being reflected normally and received by said transducer means, and means responsive to the reflected ultrasonic vibrations received by said transducer means for indicating the presence of defects in the casing.

3. Apparatus for scanning tubular members with ultrasonic vibrations which comprises a substantially cylindrical body having a plurality of equally spaced flat surfaces extending parallel to the longitudinal axis of the cylindrical body and in planes from no point in which a perpendicular may be drawn normal to the surface of the tubular member, a piezoelectric element secured to each of said flat surfaces for transmitting ultrasonic vibrations toward the surface of the tubular member and for receiving the ultrasonic vibrations reflected normally from irregular portions within said tubular member, means for electrically pulsing each of said piezoelectric elements simultaneously whereby the ultrasonic vibrations directed toward and striking defects within the tubular member are reflected normally and means connected to the piezoelectric elements responsive to the ultrasonic vibrations received by said piezoelectric elements for indicating the presence of irregular portions of the interior of the tubular member.

4. Apparatus as defined in claim 3 including means for moving said cylindrical body along the longitudinal axis of said tubular member.

5. Apparatus as defined in claim 4 in which said moving means includes a motor driven pinion engaging a rack formed on said cylindrical body.

6. Apparatus as defined in claim 3 including means for moving said cylindrical body along the longitudinal axis of said tubular member and wherein said indicator means are responsive to said moving means and to said piezoelectric elements for indicating the presence of a defect in said tubular member with respect to the longitudinal axis of said tubular member.

7. Apparatus as defined in claim 4 including coder means responsive to said crystals for converting said reflected vibrations received by said crystals into coded signals and for transmitting said coded signals, and decoder means for receiving and decoding and applying said transmitted coded signals to said indicator means.

References Cited in the file of this patent
UNITED STATES PATENTS

| | | |
|---|---|---|
| 2,416,314 | Harrison | Feb. 25, 1947 |
| 2,527,986 | Carlin | Oct. 31, 1950 |
| 2,596,023 | Goble et al. | May 6, 1952 |
| 2,628,335 | Drake | Feb. 10, 1953 |
| 2,631,270 | Goble | Mar. 10, 1953 |
| 2,648,056 | Jakosky | Aug. 4, 1953 |
| 2,700,895 | Carson | Feb. 1, 1955 |
| 2,708,485 | Vogel | May 17, 1955 |
| 2,820,214 | O'Neill | Jan. 14, 1958 |
| 2,836,059 | Beaujard et al. | May 27, 1958 |
| 2,879,126 | James | Mar. 24, 1959 |